United States Patent Office 2,926,522
Patented Mar. 1, 1960

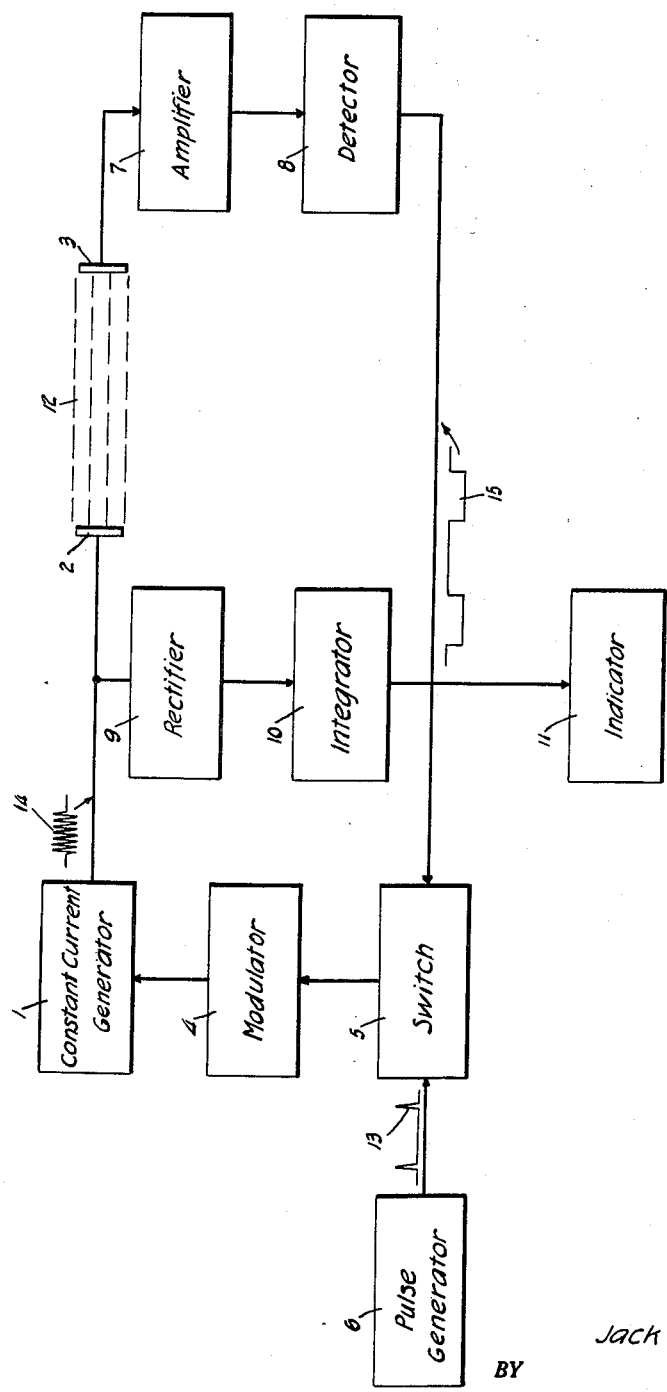

2,926,522
DENSITOMETER

Jack Kritz, Flushing, N.Y.

Application February 10, 1956, Serial No. 564,750

11 Claims. (Cl. 73—32)

The present invention relates to a device for measuring the specific gravity or the density of fluid.

A piezoelectric crystal transducer when excited at its resonant frequency and immersed in a fluid, has an electrical impedance proportional to the acoustic impedance of the fluid. The acoustic impedance is given by $\rho v$ where $\rho$ is the density and $v$ is the velocity of acoustic propagation. According to the invention, measurements are obtained of the acoustic impedance and of the velocity of acoustic propagation and the measured quantities are combined to yield an indication of the density of the fluid.

An object of the invention is to provide a simple supersonic method and apparatus for giving a continuous accurate indication of the specific gravity or density of a fluid.

The above object and other objects and advantages of the invention will become apparent from the following description and the drawings wherein:

The figure shows a block diagram of a preferred embodiment of my invention.

Referring to the drawing a constant current generator 1 provides a carrier current having a frequency substantially equal to the resonant frequency of crystal transducers 2 and 3. Transducers 2 and 3 are in acoustic contact with or immersed in the fluid to be measured and may be X-cut piezoelectric crystals. When the crystal 2 is excited at its resonant frequency, the amplitude of the voltage developed across the crystal is given by the equation $v=K\rho v$. Where $K$ is a constant of proportionality, $\rho$ is the density and $v$ is the velocity of acoustic propagation. Constant current generator 1 may be a generator of any type which is stable with respect to frequency and amplitude.

Generator 1 is controlled by a modulator 4 connected to a switching device 5. Switching device 5 may be any of the known forms of electrical or mechanical switching means capable of periodically switching the modulator 4 so as to place the generator 1 into operation. One form of suitable switching device 5 is a bi-stable multi-vibrator adapted to be triggered by a pulse generator 6 which produces preferably sharp regularly spaced pulses 13. Upon the occurrence of each pulse 13, the multi-vibrator will be placed in a condition for supplying a voltage through modulator 4 to the generator 1 for starting a train of carrier waves 14 at the output of the generator. These carrier waves, when impressed on the crystal transducer 2 produce pressure waves in the fluid 12. The pressure waves impinge on the crystal transducer 3 and cause it to supply electrical oscillation to a feedback circuit which may include an amplifier 7 and detector 8. The output of detector 8 is fed to another input of the switch or multivibrator 5. A pulse impressed on multivibrator 5 from detector 8 triggers the multi-vibrator to a condition which causes the modulator to terminate the transmission of carrier waves from generator 1. Generator 1, therefore, produces a carrier wave pulse 14 having a duration substantially equal to the time required for the pressure waves to travel through the fluid. Generator 1 remains cut off until the next pulse from generator 6 arrives at switch 5. The period between pulses 13 is made greater than the time required for waves to travel between crystals 2 and 3 through any fluid to be measured.

A rectifier 9 is connected across crystal transducer 2 to produce a rectified pulse corresponding to the carrier wave voltage pulse existing across crystal 2. The rectifier wave output of rectifier 9 is applied to an integrator 10 which produces a D.C. current. The D.C. current is then fed to any suitable utilization or measuring device such as indicator 11. Indicator 11 may be a current measuring meter.

The operation of the circuit will now be clear to those skilled in the art. Generator 1 applies a constant current pulse to crystal 2 having a carrier frequency equal to the resonant frequency of the crystal. The pulses applied to the transmitting crystal are controlled by the pulse generator 6, which produces a train of pulses 13 at a constant repetition frequency. These pulses control switch 5, and consequently the modulator 4, so that each pulse from pulse generator 6 initiates a pulse 14 of carrier wave current of constant amplitude. The amplitude of the voltage developed across crystal 2 is then proportional to the acoustic impedance of the fluid 12. Crystal 2 therefore transmits a pressure wave through the fluid having an amplitude proportional to the acoustic impedance of the fluid. The pressure waves are received by transducers 3 and cause it to generate oscillations which are amplified by amplifier 7 and detected by detector 8. The output voltage wave 15 of detector 8 is applied to switch 5 to terminate the carrier wave pulse applied by generator 1 to crystal 2. Since the acoustic wave is propagated through the fluid medium 12 with a velocity $v$ it arrives at the crystal 3 in a time given by $$t = \frac{d}{v}$$

where $d$ is the spacing between transducers 2 and 3. At a time $t$, therefore, after the carrier wave pulse 14 is initiated, the output of detector 8 is fed back through switch 5 and modulator 4 to terminate the carrier wave pulse 14. This pulse consequently has a duration proportional to $$\frac{1}{v}$$

The voltage across crystal 2 is rectified and integrated so that the output of integrator 10 will be a D.C. current having an amplitude proportional to $\rho v$ and a duration proportional to $$\frac{1}{v}$$

and hence an average value proportional to $$\rho v \frac{1}{v}$$

or $\rho$, the density of the fluid 12.

While I have illustrated the principles of my invention by a single embodiment thereof, it will be understood that many modifications and variations thereof will be apparent to those skilled in the art, therefore, the invention is not to be construed as being limited except as defined in the following claims.

I claim:

1. A densitometer comprising a first piezoelectric crystal transducer in acoustic contact with a fluid, means for generating pulses of carrier current of substantially constant amplitude and of a carrier frequency substantially equal to a resonant frequency of said crystal transducer and supplying said pulses to said transducer, means connected to the pulse generating means and responsive to the acoustic wave produced in the fluid by said transducer for producing voltage pulses and feeding the voltage pulses to said generating means for controlling the duration of each of said pulses in accordance with the reciprocal of the acoustic propagation velocity of the wave produced in said fluid by said transducer, means connected to said transducer for obtaining an electrical quantity proportional to the product of the pulse duration and the carrier wave voltage across said transducer, and means for utilizing said electrical quantity.

2. A desitometer in accordance with claim 1, comprising pulse modulator means for pulsing said generating means at a constant repetition frequency which is independent of said acoustic propagation velocity.

3. A densitometer in accordance with claim 2, wherein said means for controlling the duration of said pulses includes a second crystal transducer in acoustic contact with said fluid and positioned at a fixed distance from said first crystal transducer and arranged to receive acoustic waves propagated through said fluid by said first transducer and means connected to said second transducer for terminating each modulation pulse in response to the reception of an acoustic wave by said second transducer.

4. A densitometer in accordance with claim 3, wherein said means for obtaining said electrical quantity includes a rectifier connected to said first crystal transducer and an integrating circuit connected to the output of said rectifier.

5. A densitometer comprising a first piezoelectric crystal transducer in acoustic contact with a fluid, the density of which is to be measured, means for generating a carrier current of substantially constant amplitude and of a carrier frequency substantially equal to a resonant frequency of said crystal transducer and supplying said carrier current to said transducer, a second crystal transducer having the same resonant frequency as the first crystal transducer, said second crystal transducer being in acoustic contact with said fluid and positioned at a fixed distance from said first crystal tranducer and arranged to receive acoustic waves propagated through said fluid by said first transducer, means connected between said second transducer and said generating means for modulating said generating means with pulses having a duration substantially equal to the time required for acoustic waves to travel from said first transducer to said second transducer, means for obtaining an electrical quantity proportional to the product of the pulse duration and the carrier wave voltage across said first transducer and means for utilizing said electrical quantity.

6. A densitometer according to claim 5, wherein said means for obtaining said electrical quantity includes a rectifier connected to said first crystal transducer and an integrating circuit connected to the output of said rectifier and said utilizing means includes a density indicator connected to said integrating circuit.

7. A densitometer comprising a first piezoelectric crystal transducer in acoustic contact with a fluid, the density of which is to be measured, means for generating a carrier current of substantially constant amplitude and of a frequency substantially equal to a resonant frequency of said crystal transducer and supplying said carrier current to said transducer, a modulator connected to said generating means, switching means connected to said modulator for periodically causing said modulator to switch said generating means into an oscillating condition, a second crystal transducer in acoustic contact with said fluid positioned at a fixed distance from said first crystal transducer and arranged to receive acoustic waves propagated through said fluid by said first transducers, said second crystal transducer being resonant to the same frequency as said first crystal transducer, means connected between said second transducer and said switching means for causing said generating means to be switched back to its non-oscillating condition in response to the reception of acoustic waves by said second transducer, means connected to said first transducer for obtaining an electrical quantity proportional to the average value of the carrier wave voltage across said first transducer, and means for utilizing said electrical quantity.

8. A densitometer according to claim 7, wherein said switching means includes a multivibrator and a pulse generator connected to said multivibrator for periodically triggering said multivibrator to cause the generating means to be placed in its oscillating condition.

9. A densitometer according to claim 8, wherein said means for obtaining said electrical quantity includes a rectifier connected to said first crystal transducer and an integrating circuit connected to the output of said rectifier and said utilization means includes a density indicating means connected to the output of said integrating circuit.

10. A densitometer comprising a transducer in acoustic contact with a fluid, means for generating current pulses having a substantially constant repetition frequency and supplying said pulses to said transducer, means connected to the pulse generating means and responsive to the acoustic wave produced in the fluid by said transducer for producing voltage pulses and feeding the voltage pulses to said generating means for controlling the duration of each of said pulses in accordance with the reciprocal of the acoustic propagation velocity of the waves produced in said fluid by said transducer, means connected to said transducer for obtaining an electrical quantity proportional to the product of the pulse duration and the voltage across said transducer, and means for utilizing said electrical quantity.

11. A densitometer comprising a first transducer in acoustic contact with a fluid, the density of which is to be measured, means for supplying current pulses of substantially constant repetition frequency to said transducer, a second transducer in acoustic contact with said fluid and postioned at a fixed distance from said first transducer and arranged to receive acoustic waves propagated through said fluid by said first transducer, means connected between said second transducer and said pulse supplying means for rendering the duration of said pulses substantially equal to the time required for acoustic waves to travel from said first transducer to said second transducer, means for obtaining an electrical quantity proportional to the product of the pulse duration and the voltage across said first transducer and means for utilizing said electrical quantity.

References Cited in the file of this patent

UNITED STATES PATENTS

| 2,012,837 | Tear | Aug. 27, 1935 |
| 2,612,772 | McConnell | Oct. 7, 1952 |
| 2,669,121 | Garman et al. | Feb. 16, 1954 |
| 2,711,646 | Mendousse | June 28, 1955 |
| 2,756,404 | Anderson et al. | July 24, 1956 |

FOREIGN PATENTS

| 727,891 | Great Britain | Apr. 13, 1955 |